United States Patent [19]

Watanabe et al.

[11] Patent Number: 4,634,063

[45] Date of Patent: Jan. 6, 1987

[54] STATOR WINDING APPARATUS

[75] Inventors: Hideji Watanabe; Hiroshi Ohki; Keizou Watanabe, all of Ueda, Japan

[73] Assignee: Sanyo Denki Co., Ltd., Kitaotsuka, Japan

[21] Appl. No.: 741,278

[22] Filed: Jun. 4, 1985

[30] Foreign Application Priority Data

Jun. 4, 1984 [JP] Japan ................................. 59-114014

[51] Int. Cl.$^4$ ........................................ H02K 15/085
[52] U.S. Cl. ................................................. 242/1.1 R
[58] Field of Search ............. 242/1.1 R, 7.05 C, 7.14; 140/92.1; 29/596, 605

[56] References Cited

U.S. PATENT DOCUMENTS

| | | | |
|---|---|---|---|
| 3,082,966 | 3/1963 | Frederick | 242/1.1 R |
| 3,411,725 | 11/1968 | Biddison | 242/1.1 R |
| 3,524,600 | 8/1970 | Peters | 242/1.1 R |
| 4,274,603 | 6/1981 | Lenders et al. | 242/7.14 |
| 4,358,063 | 11/1982 | Pierce et al. | 242/1.1 R |

*Primary Examiner*—Billy S. Taylor
*Attorney, Agent, or Firm*—Pearne, Gordon, Sessions, McCoy, Granger & Tilberry

[57] ABSTRACT

A coil winding apparatus is disclosed which is capable of readily adjusting the traversing of an oscillating arm and wire delivery means to carry out the coil winding with good precision. The coil winding apparatus includes a traverse mechanism for traversing the oscillating arm and wire delivery means in the direction of axis of a coil wound article at a predetermined cycle. Also, the apparatus also includes a detector for electrically detecting motion of a main shaft to actuate the traverse mechanism according to the detected motion of the main shaft.

4 Claims, 9 Drawing Figures

STATOR WINDING APPARATUS

BACKGROUND OF THE INVENTION

1. Field of the Invention

This invention relates to a coil winding apparatus, and more particularly to a coil winding apparatus which is adapted to automatically carry out the coil winding on a core of a motor or the like.

2. Description of the Prior Art

One of coil winding apparatus which have been conventionally used is constructed in a manner such that a wire feed nozzle is actuated to accomplish the coil winding operation of which one cycle comprises raising, forward rotation, lowering and backward rotation carried out with the rotation of a motor, and a wire alignment guide arranged in the proximity to a slot of a core of an article on which a wire is to be wound to form a coil thereon (hereinafter referred to as "coil wound article") such as a motor or the like is concurrently traversed with respect to the wire feed nozzle.

Another conventional coil winding apparatus has been proposed which is so constructed that a coil wound article is inclinedly positioned with respect to a wire feeding nozzle, so that the coil formed on the coil wound article may be moved along the inclined surface of the article while the coil winding operation of which one cycle comprises raising, forward rotation, lowering and backward rotation is carried out.

However, in the conventional coil winding apparatus described above, the coil winding operation and the wire traversing operation must be carried out by means of a single drive source or a mechanism for traversing a wire is not provided. Thus, the conventional coil winding apparatus fail to wind a wire on a coil wound article in a regular order and with high precision.

SUMMARY OF THE INVENTION

The present invention has been made in view of the foregoing disadvantage of the prior art.

Generally speaking, in accordance with the present invention, a coil winding apparatus is provided which comprises a main shaft; a shaft drive mechanism for actuating the main shaft so that it may repeatedly carry out motion of which one cycle comprises a first axial movement, forward rotation, opposite axial movement and backward rotation; an oscillating arm pivotally mounted on the main shaft; wire delivery means mounted on the distal end of the oscillating arm to be revolved around a coil form on which a wire is to be wound in the form of a coil while feeding the wire therefrom with the motion of the main shaft to accomplish the coil winding operation; a traverse mechanism for traversing the oscillating arm and wire delivery means substantially radially of the main shaft in a predetermined motion, the traverse mechanism comprising a traverse drive mechanism actuated in synchronism with the motion of the main shaft and a traverse transmission mechanism interposed between the oscillating arm and the traverse drive mechanism; and a detector for electrically detecting the motion of the main shaft to actuate the traverse mechanism according to the detected motion of the main shaft.

Accordingly, it is an object of the present invention to provide a coil winding apparatus which is capable of readily adjusting the traversing of an oscillating arm and wire delivery means.

It is another object of the present invention to provide a coil winding apparatus which is capable of readily adjusting the traversing of wire delivery means and an oscillating arm to accommodate a change in configuration of a coil wound article, material of a wire, number of windings or the like.

It is a further object of the present invention to provide a coil winding apparatus which is capable of readily accomplish fine adjusting of the traversing of wire delivery means and an oscillating arm to accommodate variation in lot of a wire.

It is a still further object of the present invention to provide a coil winding apparatus which is capable of winding a wire on a coil wound article to form a coil thereon in a regular order and with good precision.

It is a yet further object of the present invention to provide a coil winding apparatus which is capable of performing the objects set forth above with a simple structure.

Still other objects of the present invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like parts throughout, wherein.

DETAILED DESCRIPTION OF THE PREFERRED EMBODIMENTS

Now, a coil winding apparatus according to the present invention will be described hereinafter with reference to the accompanying drawings.

Figure 1:
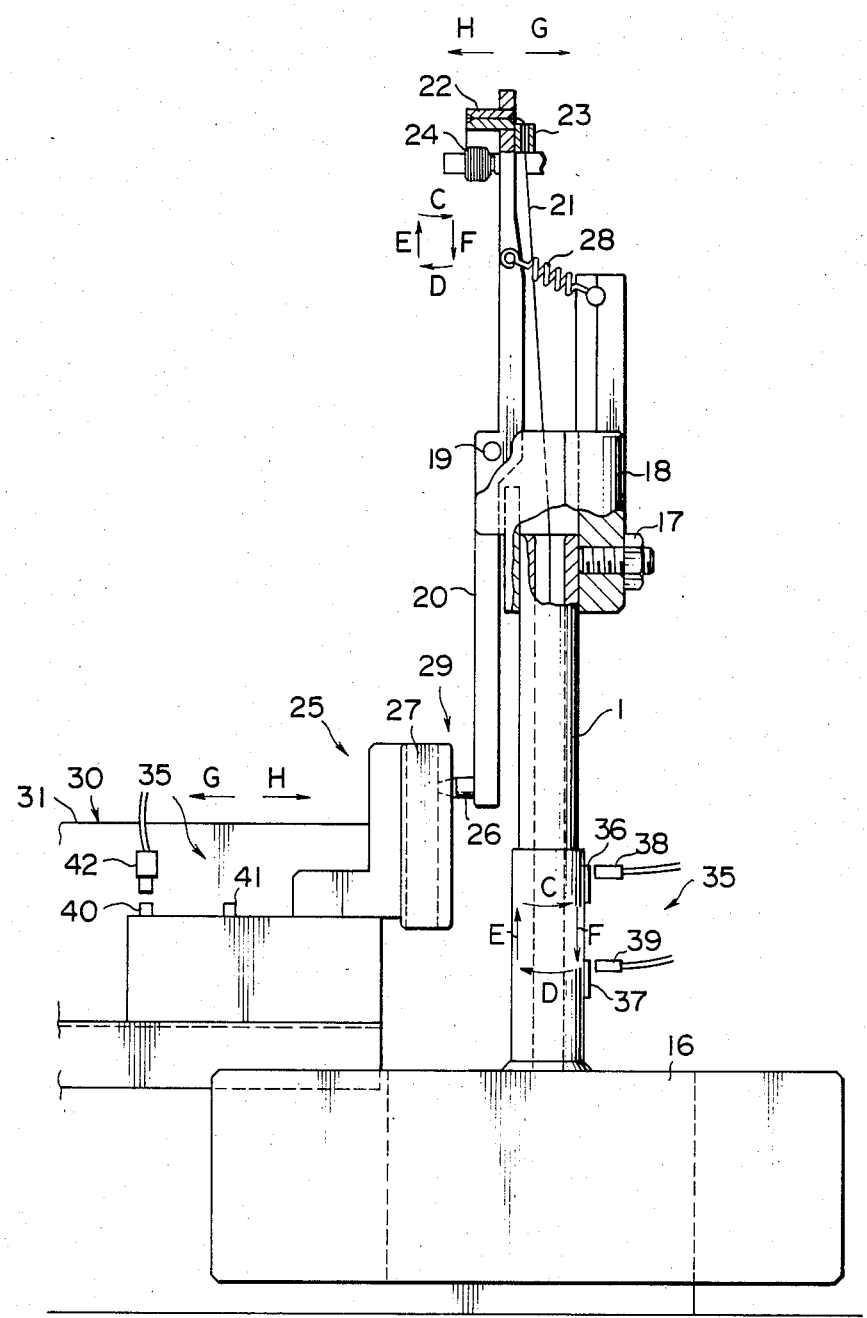
FIG. 1 is a front elevation view showing a first embodiment of a coil winding apparatus according to the present invention.
Figure 2:
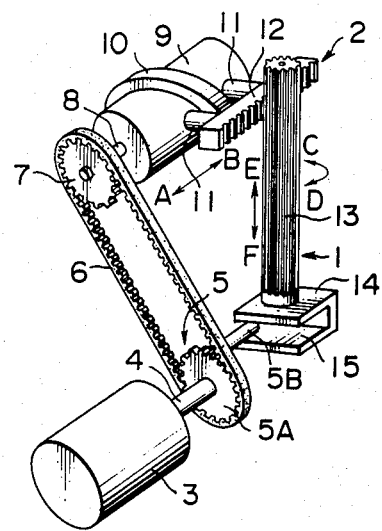
FIG. 2 is a perspective view showing a shaft drive mechanism incorporated in the coil winding apparatus shown in FIG. 1.

FIGS. 1 to 6 illustrate a first embodiment of a coil winding apparatus according to the present invention. A coil winding apparatus of the illustrated embodiment includes a main shaft 1 and a shaft drive mechanism generally designated by reference numeral 2. The shaft drive mechanism 2 is adapted to allow the main shaft 1 to repeatedly carry out motion of which one cycle comprises raising, forward rotation, lowering and backward rotation. The shaft drive mechanism 2, as shown in FIG. 2, includes a motor 3 serving as a driving source for the shaft drive mechanism 2 and having an output shaft 4, and crank means generally indicated by reference numeral 5 and arranged at the end of the output shaft 4. The crank means 5 comprises a toothed crank wheel 5A concentrically fixedly mounted on the output shaft 4 and a crank pin 5B mounted on the crank wheel 5A in a manner to outward extend therefrom and be eccentric therewith. Around the toothed crank wheel 5A is engagedly passed a toothed endless belt 6, which is then engaged with a toothed wheel 7 which is connected through a rod 8 to a cam device generally indicated by reference numeral 9.

The cam device 9 has a cam 10 formed on a cylinder to project therefrom, which is adapted to be interposedly positioned between a pair of pins 11 mounted on a rack 12 to be operationally engaged with the pins 11. The pins 11 are provided so as to extend from the rack 12 toward the cam 10 in the horizontal direction and in parallel to each other, so that the rotation of the cam device 9 may cause the rack 12 to be horizontally reciprocated in the directions indicated by arrows A and B in FIG. 2. The rack 12 is engaged with a gear 13 formed on the periphery of a part of the main shaft 1, resulting in the reciprocating movement of the rack 12 rotating the main shaft 1 in the directions indicated by arrows C and D in FIG. 2. The main shaft 1 has an engagement member 14 of a U-shape sideways mounted on the lower end thereof, which has a groove 15 laterally opened to the toothed crank wheel 5A. The crank pin 5B is engagedly fitted at the end portion thereof in the groove 15 of the engagement member 14, so that the rotation of the toothed crank wheel 5A may vertically move the main shaft 1 in the directions indicated by arrows E and F. The shaft drive mechanism 2 constructed in the manner described above is adapted to allow the main shaft 1 to repeatedly carry out motion of which one cycle comprises raising (arrow E), forward rotation (arrow C), lowering (arrow F) and backward rotation (arrow D), as detailedly described hereinafter.

Now, the construction of the main shaft 1 which is adapted to carry out such motion as described above will be described with reference to FIGS. 1 and 3 to 6.

The main shaft 1 has a lower end supported on a base plate 16 and an upper end on which an arm holder 18 is mounted by means of a screw 17. The arm holder 18 is attached thereto an oscillating arm 20 which is oscillated or pivotally moved about a pin 19. On the distal end of the oscillating arm 20 is mounted wire delivery means 22 which comprises a nozzle for outward discharging a wire 21. The wire 21 is adapted to be guided through the hollow interior of the main shaft 1 and a wire guide 23 provided at the upper end of the oscillating arm 20 to the wire delivery means 22. The wire delivery means 22 is arranged in the proximity to a coil wound article 24; thus, when the main shaft 1 carries out the above-described motion of which one cycle comprises raising, forward rotation, lowering and backward rotation, the wire delivery means 22 likewise accomplishes the same motion or the coil winding operation around the coil wound article 24 to allow the wire 21 to be wound on the article 24 to form a coil thereon in a manner as described in detail hereinafter.

The coil winding apparatus of the illustrated embodiment also includes a traverse mechanism generally indicated by reference numeral 25 which is adapted to reciprocate or traverse the oscillating arm 20 and the wire delivery means 22 with respect to the coil wound article 24 in the direction of axis or core of the article 24 at a predetermined cycle with the above-described motion of the main shaft 1, to thereby wind the wire 21 on the article 24 while traversing the wire 21 in the direction of axis of the article 24.

Figure 3:
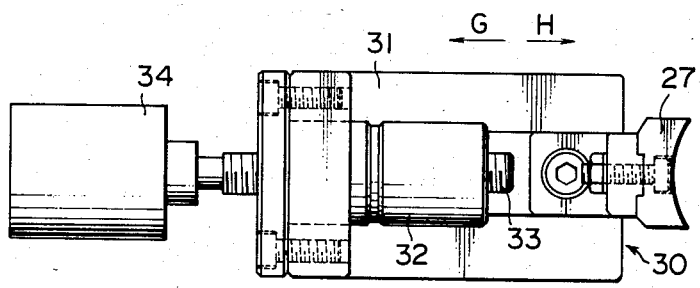
FIG. 3 is a plan view of the coil winding apparatus shown in FIG. 1.

More particularly, the traverse mechanism 25 comprises a traverse transmission mechanism 29 which comprises a cam follower 26 mounted on the other end or lower end of the oscillating arm 20, a slide cam 27 for traversing the cam follower 26 and a tension spring 28 for pressedly forcing the cam follower 26 against the slide cam 27. The traverse transmission mechanism 29 is connected to a traverse drive mechanism 30 to traverse the oscillating arm 20. The traverse drive mechanism 30, as shown in FIGS. 1 and 3, includes a unit 31 for sliding the slide cam 27, on the distal end of which the slide cam 27 is mounted. The slide cam sliding unit 31 has a nut 32 fixed thereon in which a feed screw 33 for the sliding unit 31 is threadedly inserted. The feed screw 33 for the sliding unit 31 is adapted to be rotated by means of a motor 34 depending upon the the above-described motion of the main shaft 1 electrically detected by a detector described hereinafter. Such rotation of the feed screw 33 causes the slide cam 27 to be traversed at a predetermined cycle in the directions indicated by arrows G and H in FIGS. 1 and 3. This results in the wire delivery means 22 being traversed at a predetermined cycle in the directions indicated by arrows G and H while carrying out the coil winding operation of which one cycle comprises raising (arrow E), forward rotation (arrow C), lowering (arrow F) and backward rotation (arrow D).

Figure 5A:
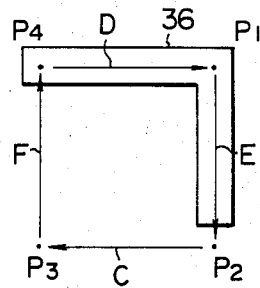
FIG. 5 is a schematic view showing magnetic patterns of a detector incorporated in a coil winding apparatus according to the present invention.
Figure 5B:
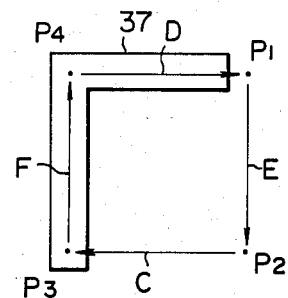
Figure 6:
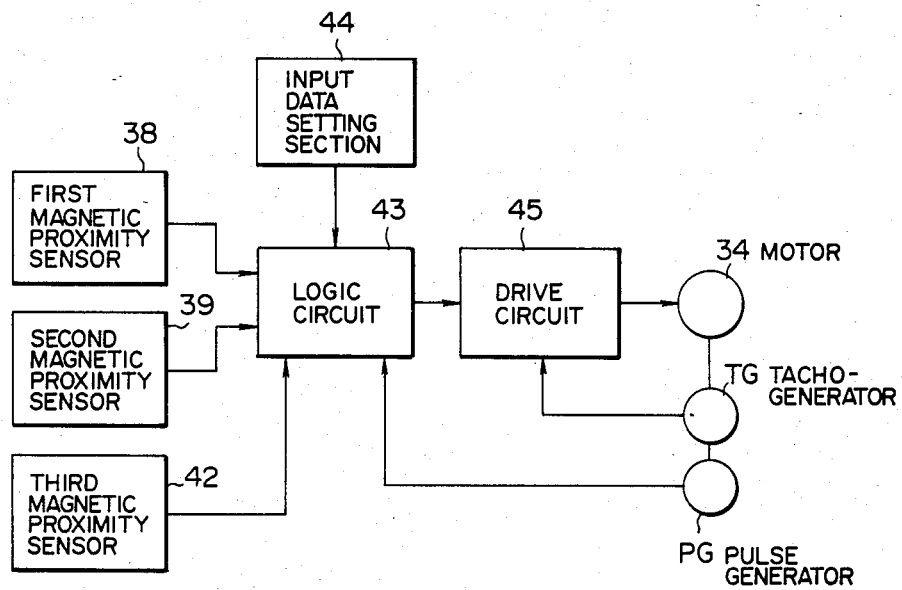
FIG. 6 is a block diagram showing the the structure of a detector incorporated in a coil winding apparatus according to the present invention.

The coil winding apparatus of the illustrated embodiment also includes a detector 35 for electrically detecting the above-described motion of the main shaft 1. The detector 35 comprises a first magnetic pattern 36 and a second magnetic pattern 37 each attached to the main shaft 1, a first magnetic proximity sensor 38 and a second magnetic proximity sensor 39 respectively positionally corresponding to the first magnetic pattern 36 and second magnetic pattern 37, a third magnetic pattern 40 and a fourth magnetic pattern 41 each attached to the slide cam sliding unit 31, and a third magnetic proximity sensor 42 corresponding to the third and fourth magnetic patterns 40 and 41. The first and second magnetic patterns 36 and 37 each are formed into a shape corresponding to a part of the locus of motion of the main shaft 1, as shown in FIGS. 5A and 5B.

The locus of motion of the main shaft 1 is substantially rectangular as planely viewed. More particularly, the locus is bent at the intersection point $P_1$ between backward rotation (arrow D) and raising (arrow E), the intersection point $P_2$ between raising (arrow E) and forward rotation (arrow C), the intersection point $P_3$ between forward rotation (arrow C) and lowering (arrow F), and the intersection point $P_4$ between the lowering (arrow F) and backward rotation (arrow D). The first magnetic pattern 36 is formed into an inverted L-shape which extends from the point $P_4$ through the point $P_1$ to this side of the point $P_2$, and the second magnetic pattern 37 is formed into an L-shape symmetrical with the first magnetic pattern 36 which extends from the point $P_3$ through the point $P_4$ to this side of the point $P_1$. Accordingly, when the first magnetic pattern 36 approaches the first magnetic proximity sensor 38, the sensor is switched on; whereas, when the second magnetic pattern 37 approaches the second magnetic proximity sensor 39, it is switched off. Thus, the on-off actions of the first and second magnetic proximity sensors 38 and 39 cause the respective intersection points $P_1$ to $P_4$ to be electrically detected.

The third magnetic proximity sensor 42 serves to electrically detect the winding start position and winding finish position along the direction of axis of the coil wound article 24 in the traverse operation. More specifically, the third magnetic proximity sensor 42 is switched on when the third magnetic pattern 40 arranged at the winding start position is approached to it due to the movement of the sliding unit 31 and switched off when the fourth magnetic pattern 41 arranged at the winding finish position is approached it.

Electrical signals supplied from the first, second and third sensors 36, 37 and 42 operated in the manner as described above, as shown in FIG. 6, are fed to a logic circuit 43 to provide a drive circuit 45 with a command signal according to an input data setting section 44 which serves to determine the number of windings and the width of traversing. This results in the drive circuit 45 generating an output signal to drive the motor 34. At this time, the rotational speed of the motor 34 is detected by means of a tachogenerator TG for speed feedback, which generates a detection signal and feeds back the signal to the drive circuit 45. Also, the rotational angle of the motor 34 is detected by a pulse generator PG, which generates a detection signal and feeds back the signal to the logic circuit 43 to carry out the stabilization of the drive circuit 45 and cause the logic circuit 43 to control the input data setting section 44 to ensure the normal operation of the motor 34.

Now, the coil winding apparatus of the illustrated embodiment constructed in the manner described above will be described hereinafter.

Figure 4:
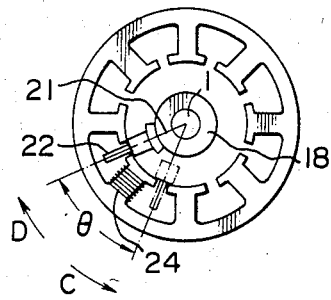
FIG. 4 is a schematic view showing the coil winding with respect to a coil winding article such as a core of a motor using a coil winding apparatus according to the present invention.

First, when the main shaft 1 is driven by the main shaft drive mechanism 1 to be upward moved in the E direction, the wire delivery means 22 is moved in the E direction. Then, the forward rotation of the main shaft 1 at a predetermined angle of $\theta$ in the C direction causes the wire delivery means 22 to be forward rotated at an angle of $\theta$ in the C direction, as shown in FIG. 4. Subsequently, when the main shaft 1 is lowered in the F direction, the wire delivery means 22 is also lowered in the F direction. Thereafter, when the main shaft 1 is backward rotated at an predetermined angle of $\theta$ in the D direction, the wire delivery means 22 is also backward rotated at an angle of $\theta$ in the D direction. During such coil winding operation of the wire delivery means 22, the first and second magnetic proximity sensors 38 and 39 electrically detect the points $P_1$, $P_2$, $P_3$ and $P_4$ on the locus of motion of the main shaft 1 of which one cycle comprises raising, forward rotation, lowering and backward rotation to generate detection signals, which are fed through the logic circuit 43 and drive circuit 45 to the motor 34 to drive it. When the points $P_1$ to $P_4$ are detected, the wire delivery means 22 is traversed by a distance corresponding to one fourth of the diameter of the wire 21. The winding start position along the direction of width of a desired coil to be formed is detected by the third magnetic proximity sensor 42 to forward rotate the motor 34 to move the wire delivery means 22 in the H direction, and the winding finish position is detected by the third magnetic proximity sensor 42 to backward rotate the motor 34 to move the wire delivery means 22 in the G direction. Thus, the slide cam 27 is traversed in the G and H directions at a predetermined cycle every time the main shaft 1 is rotated in predetermined numbers, so that the wire delivery means 22 may be traversed at a predetermined cycle in the G and H directions. Thus, the wire delivery means 22 is traversed in the G and H directions according to the motion of the main shaft 1 while carrying out the coil winding operation, accordingly, the wire 21 can be wound on the coil wound article 24 to form a coil having the predetermined number of windings in a regular order and with high precision.

Figure 7:
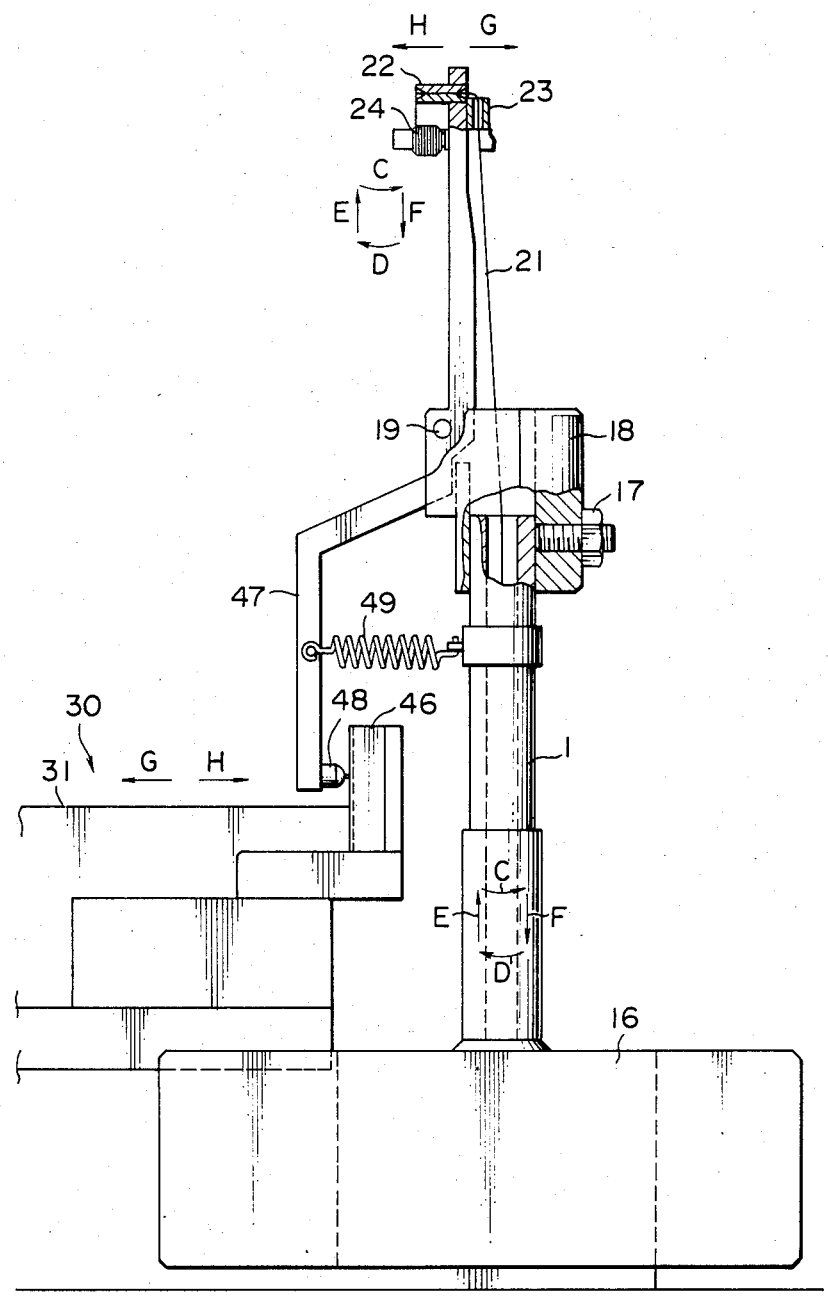
FIG. 7 is a front elevation view showing a second embodiment of a coil winding apparatus according to the present invention.
Figure 8:
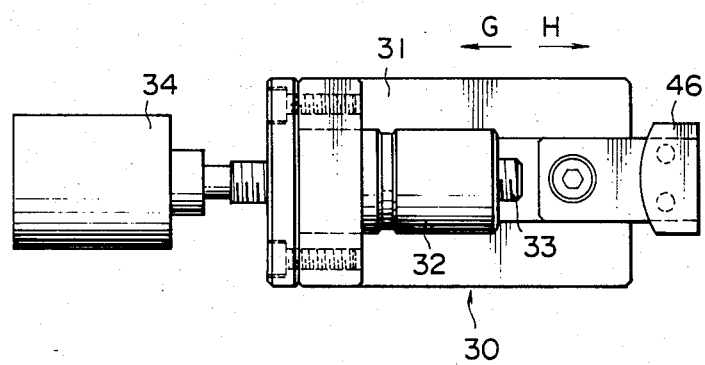
FIG. 8 is a plan view of the coil winding apparatus shown in FIG. 7.

FIGS. 7 and 8 illustrate a second embodiment of a coil winding apparatus according to the present invention.

In the second embodiment shown in FIGS. 7 and 8, a slide cam 46 having a convex cam surface instead of the slide cam 27 having a concave cam surface in the first embodiment described above is mounted on a traverse drive mechanism 30, and an oscillating arm 47 is more greatly bent to cause a cam follower 48 to be abutted against the slide cam 46 in the direction opposite to the direction in which the cam follower 26 is abutted against the slide cam 27 in the first embodiment. The remaining part of the second embodiment is constructed in substantially the same manner as the first embodiment.

As described above, in the coil winding apparatus of the present invention, the shaft drive mechanism for driving the main shaft is actuated by the drive source provided separately from that for the traverse mechanism for traversing the oscillating arm and wire delivery means at a predetermined cycle in synchronism with the motion of the main shaft. This allows the traversing of the oscillating arm and wire delivery means to be readily adjusted. Thus, the present invention can readily adjust the traversing operation to accommodate a change in configuration of a coil wound article, material of a wire, number of windings and the like. Also, the present invention can accomplish the fine adjustment of traversing of the oscillating arm and wire delivery means to accommodate variation in lot of a wire, to thereby accomplish the coil winding in a regular order and with good precision.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A coil winding apparatus comprising:
    a main shaft;
    a shaft drive mechanism for actuating said main shaft so that it may repeatedly carry out motion of which one cycle comprises a first axial movement, forward rotation, opposite axial movement and backward rotation with four turning points of motion in said cycle;
    an oscillating arm pivotally mounted on said main shaft;

wire delivery means mounted on one end of said oscillating arm to be revolved around a coil form on which a wire is to be wound in the form of a coil while feeding said wire therefrom from a winding start position to a winding finish position with said motion of said main shaft to accomplish the coil winding operation; and a traverse mechanism for traversing said oscillating arm and wire delivery means substantially radially with respect to said main shaft in a predetermined motion;

said traverse mechanism comprising a traverse drive mechanism with a cam actuated in synchronism with said motion of said main shaft and determining the amount of traverse of said oscillating arm and a traverse transmission mechanism interposed between said oscillating arm and said traverse drive mechanism;

said traverse transmission mechanism including a cam follower provided on another portion of said oscillating arm, said cam and cam follower being engaged together to transmit the movement and amount of traverse of said traverse drive mechanism therethrough to said oscillating arm;

a detector for electrically detecting said motion of said main shaft to actuate said traverse mechanism according to the detected motion of said main shaft; and said detector comprising a first detection means for detecting the turning points of said motion of said main shaft and a second detection means for detecting the winding start position and the winding finish position along a direction substantially radially of said main shaft.

2. A coil winding apparatus as defined in claim 1, wherein said first detection means comprises first and second magnetic patterns formed into shapes corresponding to a part of the locus of said motion of said main shaft and symmetrical with each other and first and second magnetic proximity sensors respectively arranged to positionally correspond to said first and second magnetic patterns, and said second detection means comprises third and fourth magnetic patterns respectively arranged at the winding start position and winding finish position and a third magnetic proximity sensor for detecting the approach of said third and fourth magnetic patterns thereto.

3. A coil winding apparatus as defined in claim 1, wherein said cam is a slidable cam.

4. A coil winding apparatus as defined in claim 3, including a spring for urging said cam follower against said slidable cam.

* * * * *